United States Patent
Shum et al.

(10) Patent No.: US 6,927,946 B2
(45) Date of Patent: Aug. 9, 2005

(54) MICRO-ACTUATOR INTEGRATED LEAD SUSPENSION HEAD TERMINATIONS

(75) Inventors: Victor Wing Chun Shum, San Jose, CA (US); Surya Pattanaik, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/984,247

(22) Filed: Nov. 9, 2004

(65) Prior Publication Data

US 2005/0083611 A1 Apr. 21, 2005

Related U.S. Application Data

(62) Division of application No. 10/128,918, filed on Apr. 24, 2002, now Pat. No. 6,833,978.

(51) Int. Cl.[7] .............................. G11B 5/48; G11B 21/21
(52) U.S. Cl. ................................ 360/294.3; 360/245.8; 360/234.5; 219/86.1; 219/121.64
(58) Field of Search .................... 360/294.3, 294.4, 360/245.8, 245.9, 234.5; 219/86.1–86.24, 121.6, 121.63, 121.64

(56) References Cited

U.S. PATENT DOCUMENTS

| | | | |
|---|---|---|---|
| 4,761,699 A | 8/1988 | Ainslie et al. ............... 360/103 |
| 5,189,578 A | 2/1993 | Mori et al. ................... 360/106 |
| 5,295,045 A | * 3/1994 | Kitano et al. ................ 361/813 |
| 5,530,604 A | 6/1996 | Pattanaik ..................... 360/104 |
| 5,737,837 A | 4/1998 | Inaba ........................... 29/884 |
| 5,757,585 A | 5/1998 | Aoyagi et al. ............... 360/104 |
| 5,793,571 A | 8/1998 | Jurgenson et al. ........... 360/104 |
| 5,812,344 A | 9/1998 | Balakrishnan ............... 360/104 |
| 5,821,494 A | 10/1998 | Albrecht et al. ........ 219/121.64 |
| 5,828,031 A | 10/1998 | Pattanaik ................ 219/121.63 |
| 5,862,010 A | 1/1999 | Simmons et al. ......... 360/97.01 |
| 5,889,636 A | 3/1999 | Arya et al. ................... 360/104 |
| 5,896,247 A | 4/1999 | Pan et al. ..................... 360/104 |
| 5,943,217 A | * 8/1999 | Hashimoto .................... 361/777 |
| 5,956,209 A | 9/1999 | Shum .......................... 360/104 |
| 6,005,742 A | 12/1999 | Cunningham et al. ... 360/78.05 |
| 6,025,988 A | 2/2000 | Yan ............................. 361/685 |
| 6,055,132 A | 4/2000 | Arya et al. .................. 360/104 |
| 6,078,473 A | 6/2000 | Crane et al. ............. 360/294.3 |
| 6,122,149 A | 9/2000 | Zhang et al. ............ 360/294.5 |
| 6,145,188 A | 11/2000 | Brooks, Jr. et al. ...... 29/603.03 |
| 6,195,227 B1 | 2/2001 | Fan et al. ................ 360/294.3 |
| 6,351,353 B1 | 2/2002 | Sluzewski et al. ....... 360/294.3 |
| 6,351,354 B1 | 2/2002 | Bonin ..................... 360/294.6 |
| 6,400,529 B1 | 6/2002 | Baba et al. .............. 360/234.4 |
| 6,414,823 B1 | 7/2002 | Crane et al. ............. 360/294.5 |
| 6,621,661 B1 | 9/2003 | Ichikawa et al. ........ 360/234.5 |
| 6,665,151 B1 | 12/2003 | Bonin et al. ............. 360/294.3 |
| 6,671,131 B2 | 12/2003 | Kasajima et al. ........ 360/294.4 |
| 6,751,061 B2 | 6/2004 | Mizuno et al. .......... 360/234.5 |
| 2001/0001587 A1 | 5/2001 | Lee et al. ................ 360/245.9 |
| 2001/0021086 A1 | 9/2001 | Kuwajima et al. ....... 360/294.4 |
| 2002/0036870 A1 | 3/2002 | Shiraishi et al. ......... 360/294.4 |

* cited by examiner

Primary Examiner—Jefferson Evans
(74) Attorney, Agent, or Firm—Walter W. Duft

(57) ABSTRACT

A technique for electrically interconnecting a disk drive suspension assembly and a micro-actuator mounting a transducer-carrying slider. A first set of termination pads is provided on a generally planar surface of the micro-actuator, adjacent a front edge portion of the micro-actuator. A set of leads is provided on the suspension assembly so as to extend generally orthogonally to the first set of termination pads and in adjacent relationship therewith. Electrical connections are provided between the first set of termination pads and the suspension assembly leads. A second set of termination pads can be provided on the micro-actuator planar surface adjacent to a front edge portion of the slider and a third set of termination pads can be provided on the slider front edge portion. The second and third sets of termination pads are then electrically connected.

14 Claims, 5 Drawing Sheets

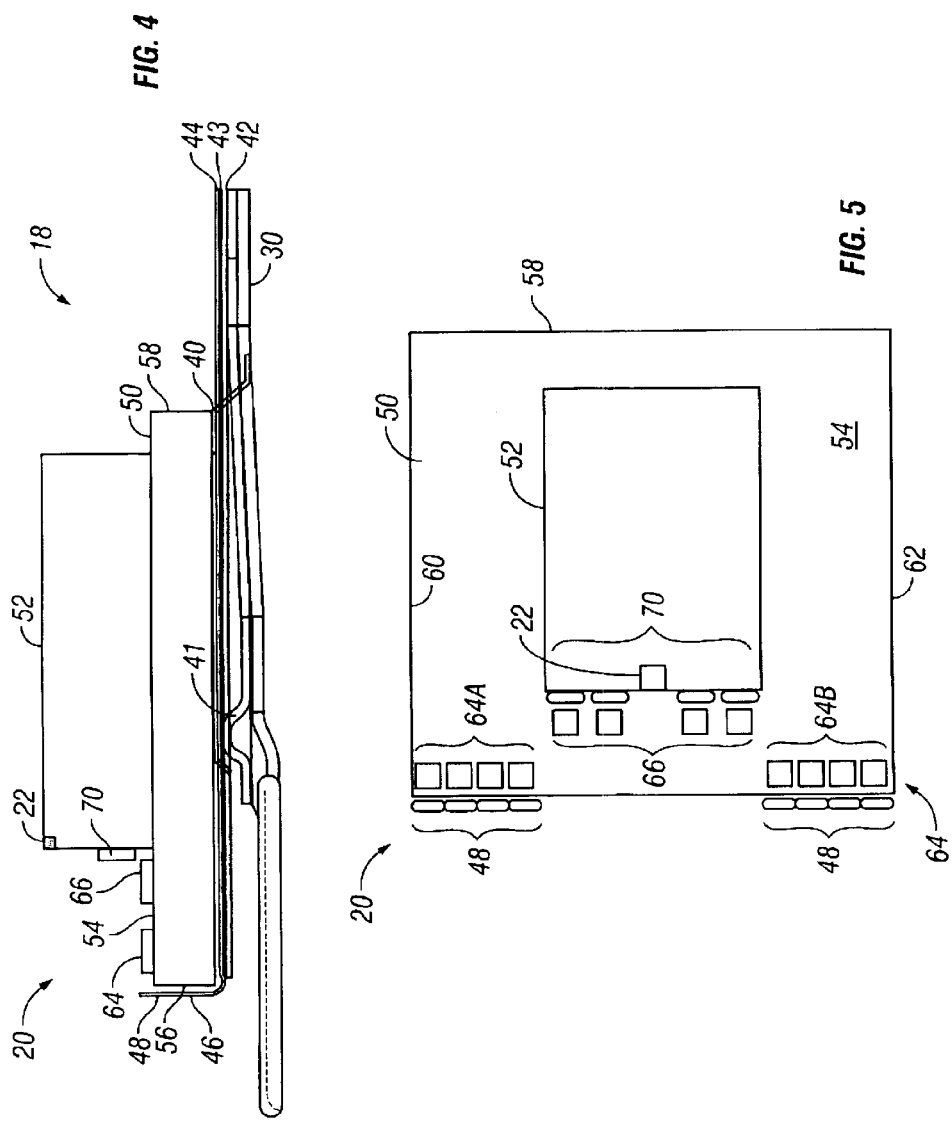

MICRO-ACTUATOR INTEGRATED LEAD SUSPENSION HEAD TERMINATIONS

This application is a divisional of application Ser. No. 10/128,918, filed on Apr. 24, 2002 now U.S. Pat. No. 6,833,978.

BACKGROUND OF THE INVENTION

1. Field of the Invention

The present invention relates to data storage apparatus for magnetically read and writing information on data storage media. More particularly, the invention concerns the interconnections of termination pads and leads in disk drive Integrated Lead Suspension (ILS) assemblies that mount micro-actuators with attached air bearing sliders.

2. Description of the Prior Art

By way of background, a read/write transducer of a magnetic disk drive storage device is typically mounted on an air bearing slider that is designed to fly closely above the surface of a spinning magnetic disk medium during drive operation. In older drive designs, the slider is mounted directly on a suspension assembly that is cantilevered from the arm of a pivotable actuator. More recently, micro-actuators have been proposed which facilitate fine positioning adjustments to help maintain the transducers above track centerlines.

A disk drive suspension assembly conventionally includes a load beam that attaches to the actuator arm and a flexure assembly that mounts to the load beam and carries the slider in a gimbaled arrangement. In an ILS assembly, the flexure assembly incorporates a laminated conductive lead system for interconnecting the transducer and the disk drive read/write electronics. If the suspension is to include a micro-actuator, there will also be leads to control micro-actuator positioning. Each of these leads must be properly connected at the slider end of the suspension assembly. For that purpose, two levels of electrical terminations are made. At the first level, there will be four terminations between the slider and the micro-actuator to electrically connect the read transducer (two connections required) and the write transducer (two connections required). At the second level, there will be eight terminations between the micro-actuator and the conductive leads of the ILS assembly. Four terminations are associated with the read and write sensors, and four terminations are associated with positioning the micro-actuator itself. In all, twelve terminations need to be made at the first and second levels.

The four slider-to-micro-actuator interconnections and the eight micro-actuator-to-ILS interconnections could possibly be made using a conventional wire bonding method. However, there are serious drawbacks in using this approach, to wit: a) a wire bonding process applies pad forces on the order of 100 grams, which is well beyond the 1–2 gram force that the fragile micro-actuator pads would be able to withstand; and b) the handling of eight fine wires to be attached to the micro-actuator would be extremely difficult in manufacturing.

Another possible slider/micro-actuator connectivity approach would be to use ultrasonic bonding of ILS bent leads, where the ends of the leads are bent into a plane that is generally parallel to the plane of a set of electrical terminal pads formed on the micro-actuator side edge. Again, there are serious drawbacks with this approach, to wit: a) the process of making the micro-actuator does not provide a method of forming pads on the side edge; and b) ultrasonic bonding also requires approximately 100 grams of force on the micro-actuator.

In light of the foregoing, an improved slider/micro-actuator connection approach is indicated. What is required is a new termination configuration and method in which a) hard wiring of the slider and micro-actuator is not required, b) wire bonding is avoided, and c) electrical terminals do not have to be placed on micro-actuator side edges.

SUMMARY OF THE INVENTION

The foregoing problems are solved and an advance in the art is obtained by an improved method of forming electrical interconnections between the leads of a disk drive suspension assembly and a micro-actuator mounting a transducer-carrying slider. According to preferred implementations of the method, a first set of termination pads is provided on a generally planar surface of the micro-actuator that is generally orthogonal to a front edge portion of the micro-actuator. The first set of termination pads is located adjacent to the micro-actuator front edge portion. A set of leads is provided on the suspension assembly so as to extend generally orthogonally to the first set of termination pads and in adjacent relationship therewith. Electrical connections are provided between the first set of termination pads and the suspension assembly leads, preferably by soldering, and most preferably by placing solder elements in mutual contact with the first set of termination pads and the leads and heating the solder elements to form a solder bond. This heating can be performed by laser and without large forces on the first set of termination pads.

Preferably, the suspension assembly leads are parallel to and in spaced adjacent relationship with the micro-actuator front edge portion. They can be made to terminate slightly beyond the micro-actuator generally planar surface and the adjacent first set of termination pads.

The method of the invention may further include providing a second set of termination pads on the micro-actuator generally planar surface in spaced relationship with the first set of termination pads and adjacent to a front edge portion of the slider. A third set of termination pads may be provided on the slider front edge portion. The second and third sets of termination pads are electrically connected. A solder element soldering method with laser heating may be used for this purpose. Preferably, the second set of termination pads is generally orthogonal to the third set of termination pads.

If desired, the first set of termination pads and the suspension assembly leads may be arranged in two groups that are spaced from each other along the micro-actuator front edge, such as on each side of the second set of termination pads and the third set of termination pads.

Note that both the first set of termination pads and the second set of termination pads are preferably formed as part of a thin film process used to fabricate the micro-actuator so as to avoid damage to the micro-actuator which could otherwise result if the termination pads were formed on the micro-actuator subsequent to its fabrication.

The invention further contemplates a suspension assembly and a disk drive that incorporate an improved termination system made in accordance with the above-summarized method.

BRIEF DESCRIPTION OF THE DRAWINGS

The foregoing and other features and advantages of the invention will be apparent from the following more particular description of preferred embodiments of the invention, as illustrated in the accompanying Drawings, in which:

FIG. 4 is a side elevational view of the ILS assembly of FIG. 3;

FIG. 5 is an enlarged top view of the micro-actuator/slider combination of FIG. 3;

DETAILED DESCRIPTION OF PREFERRED EMBODIMENTS

Figure 1:
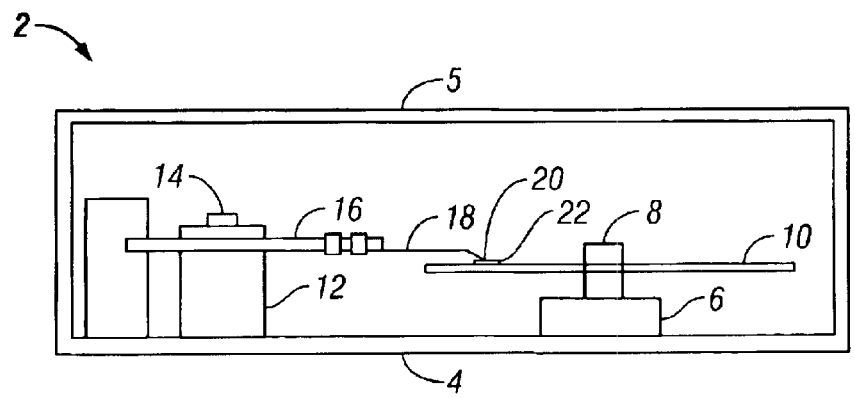
FIG. 1 is a simplified vertical sectional view of a magnetic disk drive that incorporates an ILS micro-actuator/read-write head assembly according the present invention.
Figure 2:
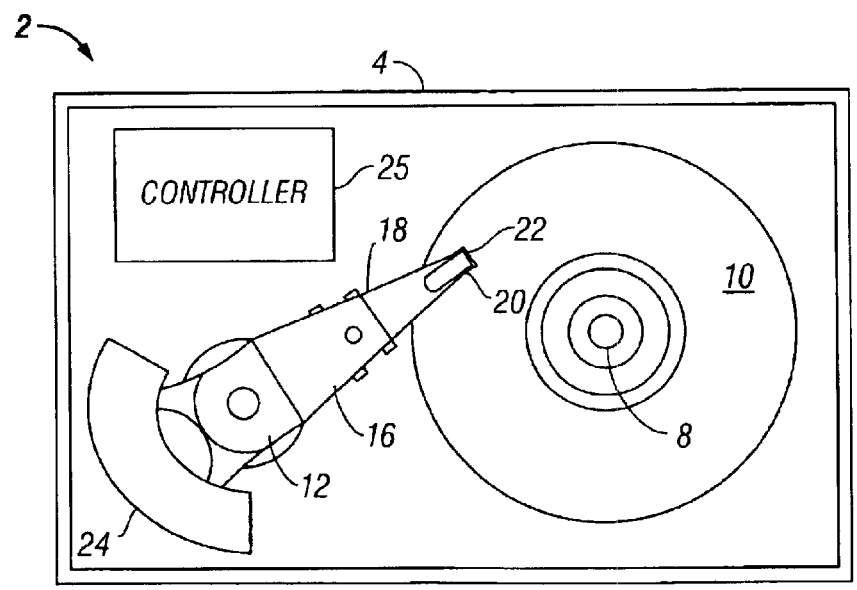
FIG. 2 is a simplified plan view of the disk drive of FIG. 1 with a cover portion thereof removed.

Turning now to the figures, wherein like reference numerals represent like elements in all of the several views, FIGS. 1 and 2 illustrate a disk drive 2 that includes an ILS assembly with a micro-actuator/slider that is electrically connected using the termination scheme of the invention. The disk drive 2 conventionally includes a base casting 4 made from cast aluminum or other suitable material. A cover 5 is removably mounted thereto via a hermetic seal (not shown). The base casting 4 mounts a conventional spindle drive motor 6 having an associated drive spindle 8. The drive spindle 8 carries a disk 10 for high-speed rotation therewith. Other disks (not shown) may also be carried on the drive spindle 8 to form a spaced vertically stacked disk platter arrangement. The disk 10 is made from a suitable material of a type usually found in magnetic disk drive assemblies. In particular, the disk 10 is formed from a suitable disk substrate with appropriate coatings being applied thereto such that at least one, and preferably both, of the upper and lower surfaces of the disk are magnetically encodable and aerodynamically configured for high speed interaction with a read/write transducer (described below).

Data access to the disk 10 is achieved with the aid of an actuator 12 that is mounted for rotation about a stationary pivot shaft 14. The actuator 12 includes a rigid actuator arm 16 that carries a flexible ILS 18. The ILS 18 in turn carries a micro-actuator/slider combination 20 that mounts a transducer 22. The transducer 22 conventionally comprises an inductive write head and a read head that may incorporate a conventional magnetoresistive sensor. The actuator 12, which is conventionally driven by a voice coil motor 24, moves the micro-actuator/slider combination 20 generally radially across the surface of the disk 10 so that the transducer 22 is able to trace concentric data tracks on the disk. Fine positioning of the transducer 22 is achieved by controlling the position of the micro-actuator portion of the micro-actuator/slider combination 20.

Data recorded on the disk 10 is read by the transducer 22 and processed into a readback signal by signal amplification and processing circuitry (not shown) that is conventionally located on the actuator arm 16. The readback signal, which could carry one or both of data and transducer position control information, is sent to the drive controller 25 for conventional processing. The controller 25 also generates write data signals during data write operations. The write data signals are delivered via circuitry carried by the actuator arm 16 and suspension 18 to the write head element of the transducer 22 for writing data onto the disk 10.

It will be appreciated that the foregoing detailed description of the disk drive 2 and the transducer 22 is exemplary in nature, and that many other design configurations would be possible while still utilizing the termination scheme of the invention. For example, as indicated above, the disk drive 2 will typically include several disks 10 arranged in a stacked array. The actuator 12 will then have several actuator arms 16, each carrying one or two suspensions 18 and micro-actuator/sliders 20 to read and write data on both surfaces of each disk.

Figure 3:
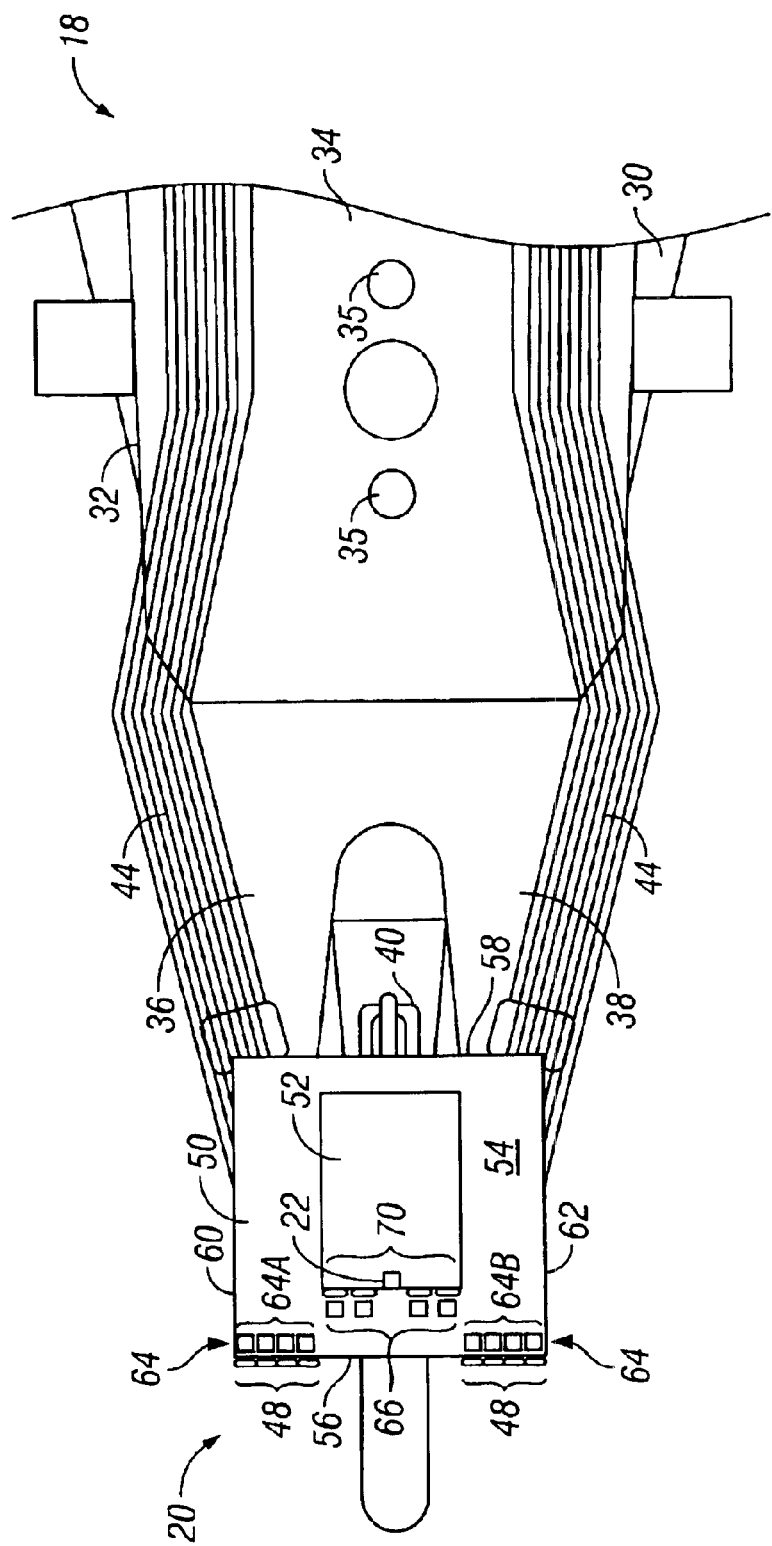
FIG. 3 is a top view of an ILS assembly with a micro-actuator/slider combination as seen by a disk surface in the disk drive of FIG. 1.

Turning now to FIGS. 3 and 4, the ILS 18 includes a load beam 30 to which is attached a flexure assembly 32. The flexure assembly 32 is a generally planar elongated structure that is aligned in generally parallel relationship with the load beam 30. A base section 34 of the flexure assembly 32 is attached to the load beam 30 using a pair of weld connections 35. Distally of the connections 35, the flexure assembly 32 forks into a pair of legs 36 and 38 (see FIG. 3). The legs 36 and 38 extend separately from each other to the distal tip of the flexure assembly 32. There, they merge together into a slider-carrying tongue (or bonding platform) 40 that cantilevers a short distance back from the merge point of the legs 36 and 38 toward the flexure assembly base section 34. The tongue 40 rests on a dimple 41 that is formed on the load beam 30. The tongue 40 is free to pitch and roll relative to the dimple 41 so as to provide a gimbaled support for the micro-actuator/slider combination 20, which is mounted on the tongue 40.

As best shown in FIG. 4, the flexure assembly 32 is formed with a support layer 42 made from thin stainless steel or the like, upon which is laminated a dielectric layer 43 and a set of electrical conductor traces 44. The dielectric layer 42 can be made from any suitable material, such as a polyimide. The conductor traces 44 may also be made from any suitable material, such as copper.

The conductor traces 44 extend from the base section 34 of the flexure assembly 32 toward the distal end of the ILS 18. There, the conductor traces 44 are formed into leads 46 that bend upwardly approximately ninety degrees from the horizontal plane of the flexure assembly 32. To facilitate soldering, the end portions 48 of the bent leads are preferably gold plated.

The micro-actuator/slider combination 20 includes a micro-actuator 50 that is mounted to an attachment portion of the tongue 40, and supports a slider 52 that carries the transducer 22. The micro-actuator 50 is a relatively thin structure that has a high aspect ratio. By way of example, the micro-actuator 50 may have a thickness of about 0.2–0.3 millimeters and length/width dimensions of about 2–4 millimeters. The micro-actuator 50 can be made using any suitable micro-fabrication technology. It has a generally planar surface 54 on which the slider 52 is mounted, a front edge 56, a rear edge 58, and a pair of side edges 60 and 62. Note that the term "planar" is used somewhat liberally in describing the surface 54 insofar as microscopic examination of the surface will reveal the existence of various structures having different heights. Nonetheless, compared to the overall macro dimensions of the micro-actuator 54, the surface 54 is relatively smooth and thus generally planar. It will be seen that the generally planar surface 54 is generally orthogonal to the front edge 56.

The micro-actuator 50 is mounted so that the front edge 56 is adjacent to the bent lead end portions 48. As can be seen in FIG. 4, the bent lead end portions 48 will be parallel to and in closely spaced relationship with the micro-actuator front edge 56 when the micro-actuator 50 is so positioned. It will also be seen that the tips of the bent lead end portions 48 are located slightly beyond the micro-actuator generally planar surface 54.

Figure 6:
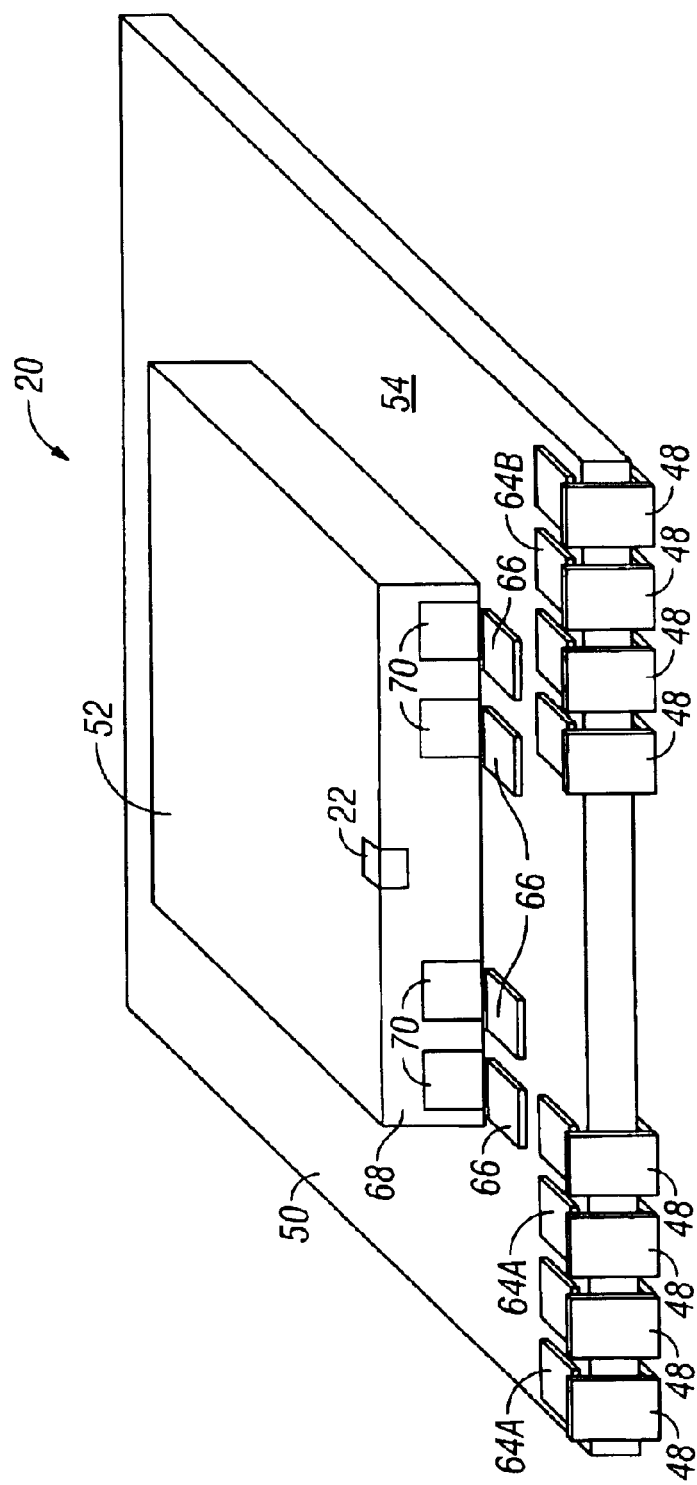
FIG. 6 is an enlarged perspective view of the micro-actuator/slider combination of FIG. 3.

With additional reference now to FIGS. 5 and 6, in order to electrically connect the micro-actuator 50 to the bent lead end portions 48, a set of eight termination pads 64 is formed on the micro-actuator generally planar surface 54, adjacent to the front edge 56. Four members of the first set of termination pads 64 provide electrical connections that are carried to the read/write elements of the transducer 22 (formed on the slider 52). The remaining four members of the first set of termination pads 64 are associated with electro-mechanically controlling the movement of the micro-actuator 50. Note that the termination pads 64 may be arranged in two groups 64A and 64B of four pads each, located on either side of the slider 52.

The first set of termination pads 64 is preferably formed during micro-actuator thin film fabrication by plating, for each pad, a base layer of nickel or other suitable material onto the micro-actuator generally planar surface 54, followed by applying a coating of gold or the like to all or part of the base layer to facilitate solder bonding. Because the first set of termination pads 64 is formed on the micro-actuator generally planar surface 54, which is horizontal in FIG. 4, it will be appreciated that the end portions 48 of the bent leads 46, which are vertical in FIG. 4, are generally orthogonal to the first set of termination pads and located in adjacent relationship.

A second set of four termination pads 66 is further provided on the micro-actuator generally planar surface 54, in spaced relationship with the first set of termination pads 64 and adjacent to the front edge 68 of the slider 52. The second set of termination pads 66 is associated with the read and write elements of the transducer 22. These termination pads can be formed during micro-actuator thin film fabrication in the same way as the first set of termination pads 64. A third set of four termination pads 70 is formed on the slider front edge 68 for connection to the second set of termination pads 66. The third set of termination pads 70 preferably faces generally orthogonally relative to the second set of termination pads 66. These pads can be formed as part of the fabrication process used to form the slider 52 (and the elements of the transducer 22 therein), and are preferably made from copper or the like with a coating of gold to facilitate solder bonding.

Figure 7A:
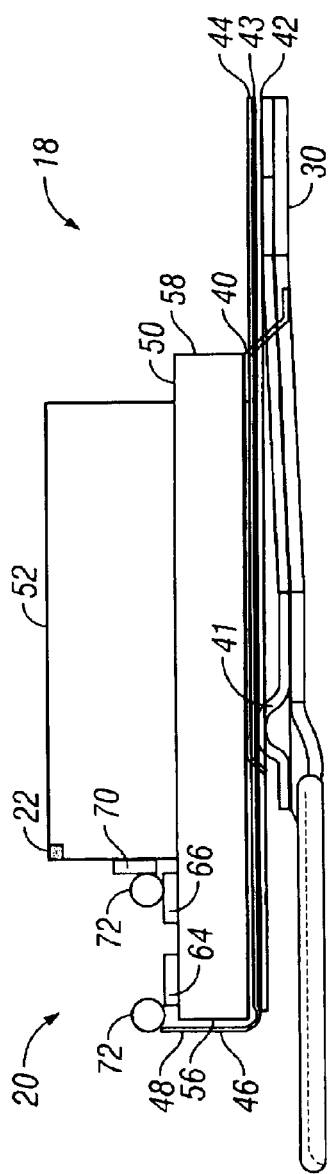
FIG. 7A is a side elevational view of the ILS assembly of FIG. 3 showing the placement of solder balls at the terminations between the micro-actuator and the slider and between the micro-actuator and the leads of the ILS assembly.
Figure 7B:
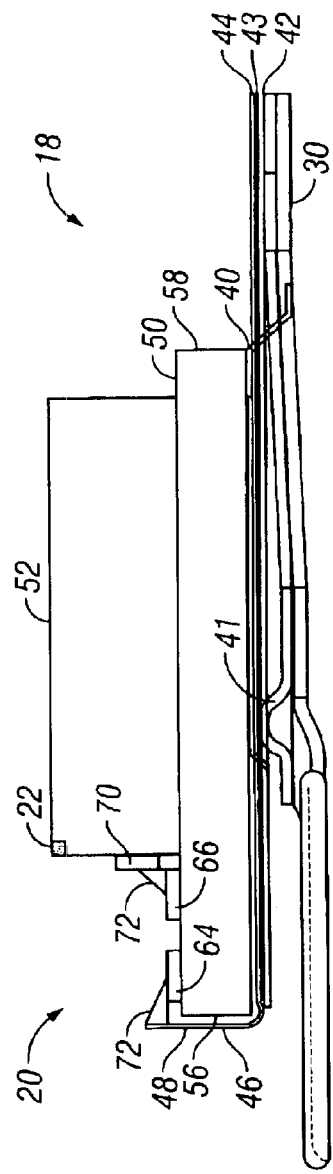
FIG. 7B is a vertical side view of the ILS assembly of FIG. 3 after the solder balls of FIG. 7A have been heated to complete the soldering of the terminations between the micro-actuator and the slider and between the micro-actuator and the leads of the ILS assembly.

Turning now to FIGS. 7A and 7B, a solder ball bonding method is preferably used to electrically connect the ILS 18 to the micro-actuator 50, and the micro-actuator to the slider 52. In particular, solder ball elements 72 are used to bond each set of mutually adjacent connection elements positioned generally orthogonally to each other. These locations are between the bent lead end portions 48 and the first set of termination pads 64, and between the second set of termination pads 66 and the third set of termination pads 70.

In FIG. 7A, each solder ball element 72 is placed at a corner formed by two orthogonal connection elements. The solder ball elements 72 are then reflowed using a heat source, such as a laser, to produce the solder bonds 74 shown in FIG. 7B.

Accordingly, a method for providing electrical interconnections between the leads of a suspension assembly and the termination pads of a micro-actuator and transducer-carrying slider has been disclosed, along with a suspension assembly and a disk drive that incorporate an improved termination system made in accordance with the inventive method. While various embodiments of the invention have been described, it should be apparent that many variations and alternative embodiments could be implemented in accordance with the invention. For example, although the invention will most commonly be used in an integrated lead suspension assembly, as described by way of example above, the invention is not necessarily limited to use with integrated lead suspensions. It is understood, therefore, that the invention is not to be in any way limited except in accordance with the spirit of the appended claims and their equivalents.

What is claimed is:

1. A method of forming electrical interconnections between the leads of a disk drive suspension assembly and a micro-actuator mounting a transducer-carrying slider, the method comprising:

providing a first set of termination pads on a generally planar surface of said micro-actuator that is generally orthogonal to a front edge portion of said micro-actuator, said first set of termination pads being located adjacent said micro-actuator front edge portion;

providing a set of leads on said suspension assembly, said suspension assembly leads extending generally orthogonally to said first set of termination pads and in adjacent relationship therewith;

providing a second set of termination pads on said micro-actuator;

providing a third set of termination pads on said slider; and electrically connecting said first set of termination pads to said suspension assembly leads and said second set of termination pads to said third set of termination pads.

2. A method in accordance with claim 1 wherein said suspension assembly leads are parallel to and in spaced adjacent relationship with said micro-actuator front edge portion.

3. A method in accordance with claim 1 wherein said suspension assembly leads terminate beyond said micro-actuator generally planar surface.

4. A method in accordance with claim 1 wherein said first set of termination pads is electrically connected to said suspension assembly leads by soldering.

5. A method in accordance with claim 1 wherein said first set of termination pads is electrically connected to said suspension assembly leads by placing solder elements in mutual contact with said first set of termination pads and said suspension assembly leads and heating said solder elements to form a solder bond.

6. A method in accordance with claim 5 wherein said solder elements are heated by laser.

7. A method in accordance with claim 1 further including:

providing said second set of termination pads on said micro-actuator in spaced relationship with said first set of termination pads and adjacent to a front edge portion of said slider; and providing said third set of termination pads on said slider front edge portion.

8. A method in accordance with claim 7 wherein said second set of termination pads is electrically connected to said third set of termination pads by soldering.

9. A method in accordance with claim 7 wherein said second set of termination pads is electrically connected to said third set of termination pads by placing solder elements in mutual contact with said second set of termination pads and said third set of termination pads and heating said solder elements to form a solder bond.

10. A method in accordance with claim 9 wherein said solder elements are heated by laser.

11. A method in accordance with claim 7 wherein first set of termination pads and said suspension assembly leads are arranged in two groups that are spaced from each other along said micro-actuator front edge.

12. A method in accordance with claim 7 wherein said first set of termination pads and said second set of termination pads are formed as part of a thin film process used to fabricate said micro-actuator.

13. A method in accordance with claim 1 wherein said second set of termination pads is generally orthogonal to said third said of termination pads.

14. A method in accordance with claim 1 wherein said first set of termination pads is formed as part of a thin film process used to fabricate said micro-actuator.

* * * * *